United States Patent
Frenken et al.

(10) Patent No.: US 6,660,336 B1
(45) Date of Patent: Dec. 9, 2003

(54) METHOD FOR PRODUCING COATED REINFORCING THREADS MADE OF HIGH-PERFORMANCE FIBERS

(75) Inventors: Johannes Frenken, Aachen (DE); Horst-Dieter Rector, Linnich (DE)

(73) Assignee: P-D Tec Fil GmbH Technische Filamente (DE)

( * ) Notice: Subject to any disclaimer, the term of this patent is extended or adjusted under 35 U.S.C. 154(b) by 0 days.

(21) Appl. No.: 09/937,186

(22) PCT Filed: Mar. 20, 2000

(86) PCT No.: PCT/DE00/00834

§ 371 (c)(1), (2), (4) Date: Jan. 28, 2002

(87) PCT Pub. No.: WO00/56676

PCT Pub. Date: Sep. 28, 2000

(30) Foreign Application Priority Data

Mar. 22, 1999 (DE) .......................... 199 12 919

(51) Int. Cl.⁷ .............................. B05D 3/02; B05D 3/12; B05D 1/18
(52) U.S. Cl. ........................ 427/379; 427/177; 427/178; 427/434.6; 427/385.5; 427/355
(58) Field of Search .......................... 427/430.1, 434.6, 427/443.2, 379, 385.5, 375, 177, 178, 355, 8

(56) References Cited

U.S. PATENT DOCUMENTS 4,975,232 A * 12/1990 Hattori et al. .............. 264/137
5,084,221 A * 1/1992 Matsuno et al. ............ 264/103

FOREIGN PATENT DOCUMENTS

EP 292572 A * 11/1988 .......... B29C/47/02

OTHER PUBLICATIONS

Japanese Patent Abstract of 08284069, by Watanabe, published Oct. 1996.*

* cited by examiner

Primary Examiner—Michael Barr
(74) Attorney, Agent, or Firm—John C. Purdue; David C. Purdue

(57) ABSTRACT

An improved method for producing impregnated reinforcing threads is disclosed. The method involves impregnating glass, carbon or aramid fibers with a twist ≦120 turns/m with a polymer dip, drawing the impregnated threads through a nozzle, drying the threads superficially in a first heating zone where they are kept moist in the core, and then providing them with a twist up to 400 turns/m in a second heating zone in which they are heated to fix this twist. The fibers are intimately impregnated with polymer, so that the impregnated threads have high fatigue strength, and a compact, constant cross section throughout their length. The impregnated threads are particularly suitable for reinforcing driving belts and high pressure hoses; they can be made into wovens and scrims which, in turn, can be used for reinforcing tires, conveyor belts and the like.

9 Claims, No Drawings

METHOD FOR PRODUCING COATED REINFORCING THREADS MADE OF HIGH-PERFORMANCE FIBERS

DESCRIPTION

The invention relates to a method of producing impregnated reinforcing threads made of high-performance fibers, in particular of glass, carbon and aramid fibers.

Reinforcing threads manufactured according to the previously known methods of this type have the disadvantage that their degree of impregnation and thus their cross section as well are not constant over the entire running length the result of which is irregularities as far as loadability is concerned.

The object of the present invention consists in avoiding in particular the abovementioned disadvantages in the manufacture of reinforcing threads.

According to the invention, this object is achieved in that the threads are impregnated, in polymer dip with 0 twist or with a protective twist of $\leq 120$ revolutions/m, in that the impregnated threads are then drawn through a nozzle, in that they are subsequently provided with a twist up to 400 rev/m in a heating zone and fixed at this twist by heating, and in that the above method steps are carried out in one continuous run.

The in any case low twist of the threads during the impregnation process makes it possible for the polymer to come closer to the individual fibers and envelop them protectively. In the following nozzle, the thread cross section constituted by raw fibers and polymer is accurately specified. As the cross section of the thread introduced is at the same time known in advance, the quantity of polymer borne by the thread after passing through the nozzle is also defined in this way. The cavities becoming free in the thread on account of evaporation during the drying processes are closed in the second heating zone by the twist applied to the thread there, so that, after fixing, a compact, highly loadable thread with a homogeneous distribution of the polymer in the thread cross section is produced. The continuous operation of the method leads in particular to time, and thus also costs, being saved. Over and above this, moisture and temperature can be controlled accurately over the thread length in this method. Deformations, which can otherwise occur in the event of intermediate storage, are entirely excluded in this method.

According to the invention, it is also proposed that the moisture content of the threads is adjusted constantly to a specific value at least before entering the second heating zone. As a result, the constancy of the thread quality over the thread length is further increased.

According to the invention, it is also proposed that the impregnated threads are dried superficially in a first heating zone after leaving the nozzle, but are still kept moist in the core, and that they are only subsequently provided with a twist up to 400 rev/m in a second heating zone and fixed at this twist by heating.

According to the invention, it is also proposed that the threads are reeled after fixing. They can then go forward to further production operations.

It has proved expedient if the threads undergo final drying during reeling.

The threads manufactured according to the method are especially suitable for reinforcing driving belts and high-pressure hoses above all on account of their high fatigue strength under reversed bending stress. Wovens and scrims, which can in turn be used for reinforcing tires and conveyor belts, can be manufactured from these threads. Over and above this, the threads manufactured thus can be used for many other applications.

In accordance with the method according to the invention, for example, a thread made of high-performance fibers, in particular of glass, carbon and aramid fibers, is guided through an impregnating bath with a protective twist of 20 revolutions/m, in which bath a polymer, for example latex, is present in the liquid state. The only slightly twisted thread allows the polymer space to penetrate the thread and envelop the individual fibers The thread thus impregnated is then supplied to a nozzle which, at its exit, defines the cross section of the thread and thus, on account of the known cross section of the raw fibers, the cross section of the space taken up by the polymer also and thus finally also the weight proportion of the polymer contained in the thread. The thread leaves the nozzle with a cross section which remains constant over the length. It is subsequently supplied to a first heating zone, in which it is dried superficially and forms a skin. The heating of the first heating zone is in any case to be adapted in such a manner that the thread is still moist in the core after leaving this heating zone.

This thread is then supplied via a delivery device to a second heating zone, at the end of which a twist of, for example, 300 revolutions/m is applied to the thread. This twist affects the thread from the output end of the delivery device. It leads to a wringing effect which combines the fibers into a compact thread by closing cavities which have formed by evaporation effects in the heating zones. The moisture of the thread is detected at least before the second heating zone, and the first heating zone is adapted by corresponding regulation. A corresponding detection of the moisture of the thread is also appropriate after the second heating zone, so as then to regulate the second heating zone thereby.

It may prove expedient to combine the functions of the first and the second heating zones in one heating zone.

The twist of the thread is applied by a reeling device which at the same time winds the thread up onto a reel. Final drying of the thread takes place during this winding process.

During passage through the second heating zone, fixing of the thread and the twist applied to it takes place.

A thread manufactured according to this method is subsequently used as a thread for reinforcing components, in particular driving belts and high-pressure hoses. However, wovens or scrims, which can then in turn be used for reinforcing tires or conveyor belts or similar highly loadable components, can also be manufactured from this thread.

What is claimed is:

1. A method of producing impregnated reinforcing threads made of glass, carbon or aramid fibers, characterized in that the fibers are impregnated in polymer dip with 0 twist or with a protective twist of $\leq 120$ turns/m, in that the impregnated threads are then drawn through a nozzle, in that the impregnated threads after being drawn through the nozzle are dried superficially in a first heating zone, but left with a moist core, in that the superficially dried threads are subsequently provided with a twist or with an increased twist up to 400 turns/m and fixed at this twist by heating in a second heating zone, and in that the above method steps are carried out in one continuous run.

2. A method as claimed in claim 1, characterized in that the moisture content of the threads is adjusted constantly to a specific value at least before the threads enter the second heating zone.

3. A method as claimed in claim 1, characterized in that the threads are reeled after fixing.

4. A method as claimed in claim 2, characterized in that the threads are reeled after fixing.

5. A method as claimed in claim 3, characterized in that the threads undergo final drying during reeling.

6. A method as claimed in claim 4, characterized in that the threads undergo final drying during reeling.

7. A driving belt or a high pressure hose reinforced with threads produced by the method claimed in claim 1.

8. A woven or scrim fabric comprising threads produced by the method claimed in claim 1.

9. A tire or conveyor belt reinforced with a woven or scrim fabric as claimed in claim 8.

* * * * *